(12) United States Patent
Wang

(10) Patent No.: US 11,086,155 B2
(45) Date of Patent: Aug. 10, 2021

(54) FLEXIBLE DEVICE AND METHOD OF MANUFACTURING THE SAME, AND DISPLAY APPARATUS

(71) Applicant: BOE TECHNOLOGY GROUP CO., LTD., Beijing (CN)

(72) Inventor: Jianguo Wang, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 16/834,411

(22) Filed: Mar. 30, 2020

(65) Prior Publication Data

US 2021/0003878 A1 Jan. 7, 2021

(30) Foreign Application Priority Data

Jul. 4, 2019 (CN) .......................... 201910599856.8

(51) Int. Cl.
| | | |
|---|---|---|
| *G02F 1/13* | (2006.01) | |
| *G02F 1/1333* | (2006.01) | |
| *G02F 1/13357* | (2006.01) | |
| *G02F 1/1339* | (2006.01) | |
| *G02F 1/1335* | (2006.01) | |

(52) U.S. Cl.
CPC ...... *G02F 1/133305* (2013.01); *G02F 1/1339* (2013.01); *G02F 1/133603* (2013.01); *G02F 1/133612* (2021.01)

(58) Field of Classification Search
CPC ......... G02F 1/133305; G02F 1/133603; G02F 1/1339; G02F 1/133612
See application file for complete search history.

(56) References Cited

U.S. PATENT DOCUMENTS

| | | | | |
|---|---|---|---|---|
| 2007/0048970 | A1* | 3/2007 | Suzuki | ............... H01L 51/0021 |
| | | | | 438/455 |
| 2008/0014532 | A1 | 1/2008 | Kessel et al. | |
| 2008/0188624 | A1* | 8/2008 | Yano | ....................... C08K 5/09 |
| | | | | 525/342 |

(Continued)

FOREIGN PATENT DOCUMENTS

| | | |
|---|---|---|
| CN | 103325731 A | 9/2013 |
| CN | 104501840 A | 4/2015 |

(Continued)

OTHER PUBLICATIONS

First Office Action dated Dec. 8, 2020 in Chinese Application No. 201910599856.8, with English translation.

*Primary Examiner* — Anne M Hines
(74) *Attorney, Agent, or Firm* — McDermott Will and Emery LLP

(57) ABSTRACT

A method of manufacturing the flexible device includes: forming a photosensitive film on a hard base substrate, the photosensitive film including a photosensitive resin material containing azide; forming a base including an inorganic material on the photosensitive film; forming an electronic device functional layer on the base; forming an encapsulation layer on the electronic device functional layer; irradiating the photosensitive film at a side of the base substrate away from the encapsulation layer; and peeling off an entire structure including the base, and the electronic device functional layer and the encapsulation layer that have been formed on the base from the photosensitive film.

20 Claims, 12 Drawing Sheets

(56) References Cited

U.S. PATENT DOCUMENTS

| | | | | |
|---|---|---|---|---|
| 2014/0166947 A1* | 6/2014 | Uchikawa | ............... | G03F 7/105 |
| | | | | 252/586 |
| 2015/0252131 A1* | 9/2015 | Ito | ........................... | G02B 1/04 |
| | | | | 428/195.1 |
| 2018/0304575 A1 | 10/2018 | Liu et al. | | |

FOREIGN PATENT DOCUMENTS

| | | |
|---|---|---|
| CN | 107086010 A | 8/2017 |
| CN | 107742618 A | 2/2018 |
| CN | 109088006 A | 12/2018 |

\* cited by examiner

FLEXIBLE DEVICE AND METHOD OF MANUFACTURING THE SAME, AND DISPLAY APPARATUS

CROSS-REFERENCE TO RELATED APPLICATION

This application claims priority and benefits to Chinese Patent Application No. 201910599856.8 filed on Jul. 4, 2019, which is incorporated herein by reference in its entirety.

TECHNICAL FIELD

The present disclosure relates to the field of flexible devices, and in particular, to a flexible device and a method of manufacturing the same, and a display apparatus.

BACKGROUND

With the advancement of electronic technologies, flexible devices have been developed rapidly, and applied more and more widely. The flexible devices have advantages of lightness and thinness, crimpability and the like, and have good application prospects in the fields of smart wearables, portable terminals and the like.

SUMMARY

In one aspect, embodiments of the present disclosure provide a method of manufacturing a flexible device. The method includes: forming a photosensitive film on a hard base substrate, the photosensitive film includes a photosensitive resin material containing azide; forming a base including an inorganic material on the photosensitive film; forming an electronic device functional layer on the base; forming an encapsulation layer on the electronic device functional layer; irradiating the photosensitive film at a side of the base substrate away from the encapsulation layer; and peeling off an entire structure including the base, and the electronic device functional layer and the encapsulation layer have been formed on the base from the photosensitive film.

In some embodiments, forming the photosensitive film, includes: forming the photosensitive film by using a photosensitive resin material containing azidonaphthalene compound.

In some embodiments, forming the photosensitive film, includes: forming the photosensitive resin material containing the azidonaphthalene compound on the base substrate by a coating process; and sequentially pre-baking and curing the photosensitive resin material formed on the base substrate to form the photosensitive film with a thickness of approximately 0.3 µm to approximately 8 µm.

In some embodiments, forming the base including the inorganic material on the photosensitive film, includes: forming the base on the photosensitive film by using an inorganic material including at least one of silicon nitride, silicon dioxide or silicon oxynitride.

In some embodiments, forming the encapsulation layer on the electronic device functional layer, includes: forming an encapsulation layer with a thickness of approximately 5 µm to approximately 100 µm on the electronic device functional layer by using silicone rubber.

In some embodiments, peeling off the entire structure including the base, and the electronic device functional layer and the encapsulation layer that have been formed on the base from the photosensitive film, includes: pulling up the encapsulation layer from an edge of the base substrate to peel off the base from the photosensitive film.

In some embodiments, forming the electronic device functional layer on the base, includes: forming a first conductive pattern layer including signal lines on the base; forming a first insulating layer on the first conductive pattern layer, the first insulating layer including at least one first via hole at a position corresponding to each of at least part of the signal lines; forming a second conductive pattern layer including pads on the first insulating layer, each of at least part of the pads being connected to a corresponding signal line through at least one first via hole; forming a second insulating layer including second via holes on the second conductive pattern layer; and bonding each of a plurality of light-emitting devices to two pads through different second via holes.

In some embodiments, forming the first conductive pattern layer including the signal lines on the base, includes: forming a copper film with a thickness of approximately 2 µm to approximately 100 µm on the base by copper; and patterning the copper film through exposure, development, and etching processes to form the first conductive pattern layer including the signal lines.

In some embodiments, forming the second conductive pattern layer including the pads on the first insulating layer, includes: forming a metal reflective film on the first insulating layer; forming a transparent conductive protective film on the metal reflective film; and performing a single patterning process on the metal reflective film and the transparent conductive protective film to form the second conductive pattern layer including the pads. Each pad includes a metal reflective sub-pattern and a transparent conductive protective sub-pattern that are stacked. Or, forming a second conductive pattern layer including pads on the first insulating layer, includes: forming a first transparent conductive protective film on the first insulating layer; forming a metal reflective film on the first transparent conductive protective film; forming a second transparent conductive protective film on the metal reflective film; and performing a single patterning process on the first transparent conductive protective film, the metal reflective film and the second transparent conductive protective film to form the second conductive pattern layer including the pads. Each pad includes a first transparent conductive protective sub-pattern, a metal reflective sub-pattern and a second transparent conductive protective sub-pattern, all of which are stacked.

In some embodiments, forming a second conductive pattern layer including pads on the first insulating layer, includes: forming a second conductive pattern layer including a plurality of first pads, a plurality of second pads and a plurality of reflective patterns on the first insulating layer. Each first pad extends in a first direction, each second pad extends in a second direction perpendicular to the first direction. At least two rows of second pads are disposed between every two first pads adjacent to each other in the second direction, each row of second pads includes at least one second pad arranged in the second direction, and each reflective pattern is formed in a region surrounded by two adjacent rows of second pads and two adjacent first pads.

In another aspect, embodiments of the present disclosure further provide a flexible device including the base, the encapsulation layer and the electronic device functional layer. The electronic device functional layer is disposed between the base and the encapsulation layer.

In some embodiments, the encapsulation layer includes silicon rubber, and a thickness of the encapsulation layer is in a range from approximately 5 µm to approximately 100 µm.

In some embodiments, the base includes an inorganic material, the inorganic material includes at least one of silicon nitride, silicon dioxide or silicon oxynitride, and a thickness of the base is in a range from approximately 100 nm to approximately 1000 nm.

In some embodiments, the flexible device is a backlight in a liquid crystal display apparatus.

In some embodiments, the electronic device functional layer includes: a first conductive pattern layer, a first insulating layer, a second conductive pattern layer, a second insulating layer and a plurality of light-emitting devices, all of which are sequentially stacked in a direction away from the base toward the encapsulation layer. The first conductive pattern layer includes signal lines. The first insulating layer includes at least one first via hole at a position corresponding to each of at least part of the signal lines. The second conductive pattern layer includes pads, and each of at least part of the pads is connected to a corresponding signal line through at least one first via hole. The second insulating layer includes second via holes. Each of the plurality of light-emitting devices is connected to two pads through different second via holes.

In some embodiments, the pads includes a plurality of first pads and a plurality of second pads, each first pad extends in a first direction, and each second pad extends in a second direction perpendicular to the first direction. At least two rows of second pads are disposed between every two first pads adjacent to each other in the second direction, and each row of second pads includes at least one second pad arranged in the second direction. The second conductive pattern layer further includes a plurality of reflective patterns, and each reflective pattern is in a region surrounded by two adjacent rows of second pads and two adjacent first pads.

In some embodiments, the plurality of light-emitting devices are divided into a plurality of groups that are arranged in an array, and each group includes at least four light-emitting devices. The at least four light-emitting devices are divided into at least two subgroups, each subgroup includes at least two light-emitting devices connected in series through a row of second pads, and the at least two subgroups are connected in parallel through two first pads adjacent to each other in the second direction. The group corresponds to two signal lines, and one of the two signal lines is electrically connected to one of the two first pads through at least one first via hole. Another one of the two signal lines is electrically connected to another one of the two first pads through at least one first via hole.

In some embodiments, one of the pads includes a metal reflective sub-pattern and a transparent conductive protective sub-pattern disposed on a surface of the metal reflective sub-pattern facing away from the base. Or, one of the pads includes: a metal reflective sub-pattern, a first transparent conductive protective sub-pattern disposed on a surface of the metal reflective sub-pattern facing the base, and a second transparent conductive protective sub-pattern disposed on a surface of the metal reflective sub-pattern facing away from the base.

In some embodiments, one of the plurality of light-emitting devices is a mini light-emitting diode (Mini LED) or a micro light-emitting diode (Micro LED).

In yet another aspect, embodiments of the present disclosure further provide a display apparatus including the flexible device described above.

BRIEF DESCRIPTION OF THE DRAWINGS

In order to describe technical solutions in embodiments of the present disclosure more clearly, the accompanying drawings to be used in the description of embodiments will be introduced briefly. Obviously, the accompanying drawings to be described below are merely some embodiments of the present disclosure, and a person of ordinary skill in the art may obtain other drawings according to these drawings without paying any creative effort.

DETAILED DESCRIPTION

Figure 1:
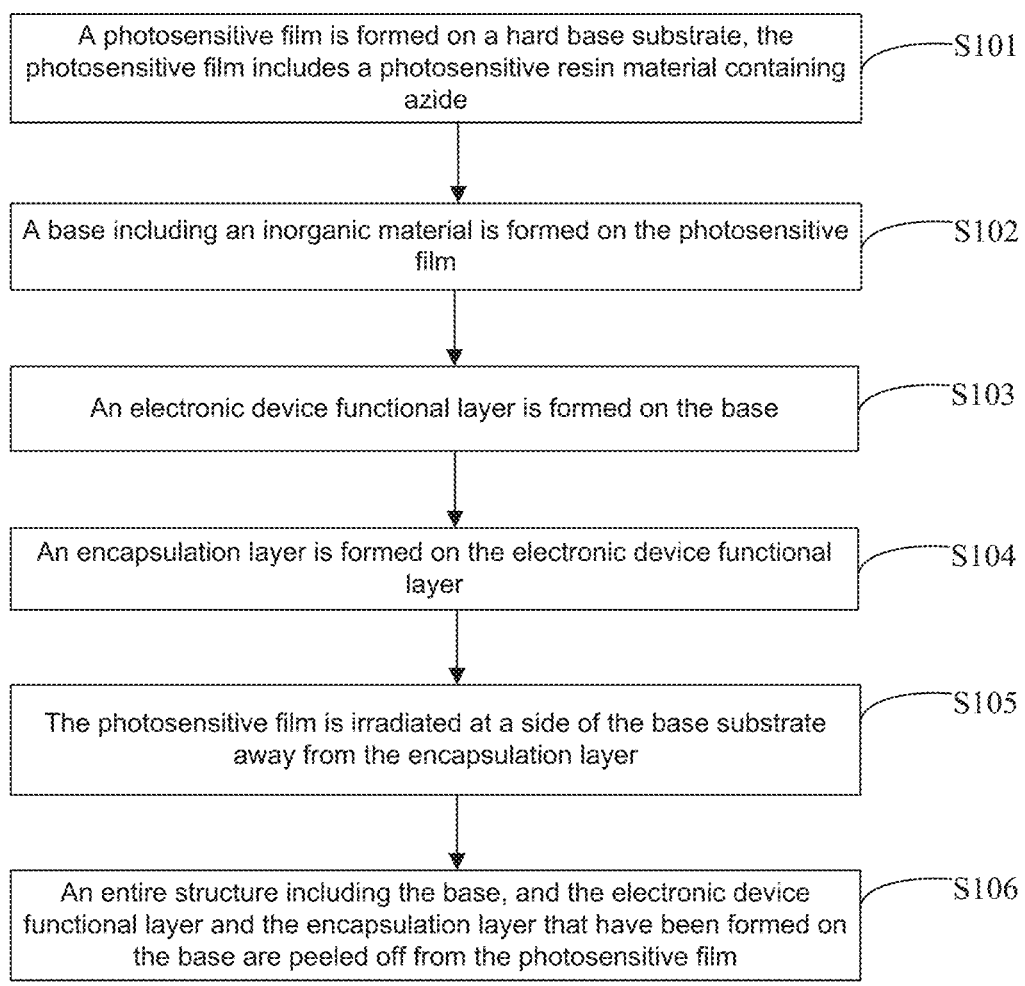
FIG. 1 is a flow diagram of a method of manufacturing a flexible device, according to some embodiments of the present disclosure.

In order to make the objectives, technical solutions and advantages in embodiments of the present disclosure clearer, the technical solutions in the embodiments of the present disclosure will be described clearly and completely with reference to the accompanying drawings in the embodiments of the present disclosure. Obviously, the described embodiments are merely some but not all of embodiments of the present disclosure. All other embodiments made on the basis of the embodiments of the present disclosure by a person of ordinary skill in the art without paying any creative effort shall be included in the protection scope of the present disclosure.

Unless otherwise defined, technical terms or scientific terms used in the embodiments of the present disclosure shall be understood as ordinary meanings by a person of ordinary skill in the field that the present disclosure belongs to. Terms "first", "second" and the like used in the embodiments of the present disclosure are not intended to mean any order, quantity or importance, and are merely used to distinguish different components. A word "include" or "comprise" or the like is intended to mean that an element or object preceding the word covers an element or objec listed after the word and its equivalent, without excluding other elements or object. A word "connect", "couple" or a similar word thereof is not limited to physical or mechanical connections, but may include electrical connections, whether direct or indirect.

In addition, orientation terms such as "upper", "lower", "left", "right", "horizontal", and "vertical" are defined relative to positions of components placed in the drawings. It will be understood that these directional terms are relative concepts and used for relative description and clarification, which may be changed correspondingly according to changes of the positions of the components placed in the drawings.

As used herein, "about" or "approximately" includes the value and the average value within a range of acceptable deviations from a particular value. The range of acceptable deviations is determined by errors associated with measurement under discussion or a specific amount of measurement (i.e., limitations of a measurement system), which is known by those of ordinary skill in the art.

As used herein, the description "an A layer is formed/disposed on a B layer" is not limited to the situation in which the A layer is directly formed/disposed on the B layer, and there may be one or more layers between the A layer and the B layer.

In a process of manufacturing a flexible device of a flexible electronic product, a polyimide film (PI film) is generally formed on a hard glass substrate, and then related electronic devices are manufactured on the PI film. After the related electronic devices are manufactured, the hard glass substrate is separated from the PI film, thereby forming the flexible device using the PI film as a base.

With regard to the flexible device using the PI film as a base, on the one hand, since a high-temperature curing process is required during a process of forming the PI film, the glass substrate with a bearing function is required to be a high-temperature glass substrate, resulting in an increase in costs. On the other hand, since the PI film is used as a supporting base of the flexible device, a thickness of the PI film is large, and the PI film itself has large stress. Therefore, such a design may easily cause the glass substrate to be deformed excessively to be broken.

On this basis, some embodiments of the present disclosure provide a method of manufacturing a flexible device. As shown in FIG. 1, the method includes S101 to S106.

Figure 2:
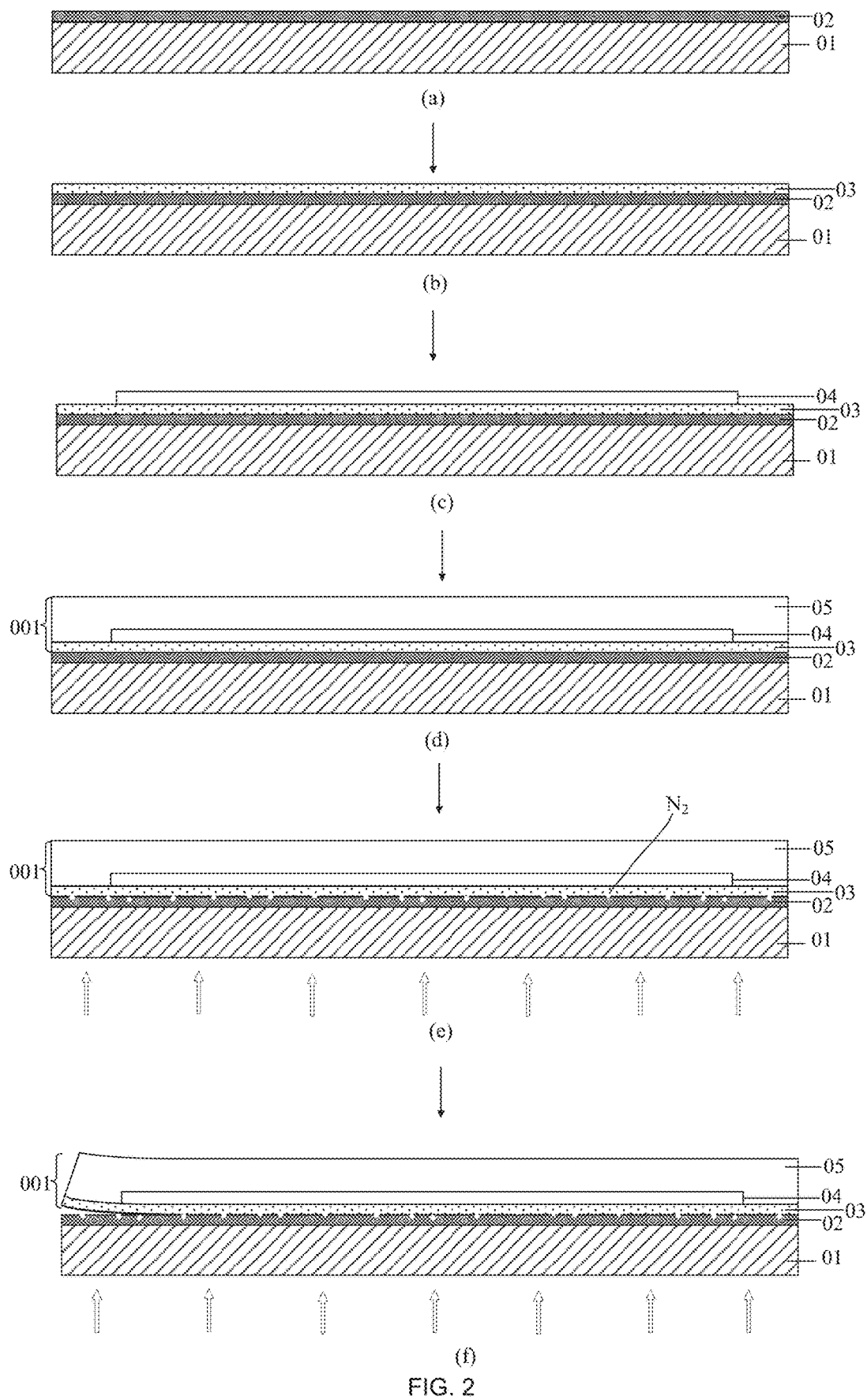
FIG. 2 is a schematic diagram of a process of manufacturing a flexible device, according to some embodiments of the present disclosure.

In S101, as shown in part (a) of FIG. 2, a photosensitive film 02 is formed on a hard base substrate 01. The photosensitive film 02 includes a photosensitive resin material containing azide.

The term "hard base substrate" refers to a base substrate with an elastic modulus of 70 GPa to 85 GPa, such as 70.6 Gpa, 71 Gpa, 73 Gpa, 75 Gpa, 79 Gpa, 72 Gpa, or 85 Gpa.

In this case, during a manufacturing process of the flexible device, the base substrate 01 will not be deformed excessively to affect precision of the flexible device. In some embodiments, the hard base substrate 01 is a glass substrate. The glass substrate may be an ordinary glass substrate, or the high-temperature glass substrate. The hard base substrate 01 may also be any other hard base substrate, which is not limited herein.

The photosensitive film 02 may be directly formed on the base substrate 01. Alternatively, the method further includes: forming one or more layers on the base substrate 01 before forming the photosensitive film 02. Accordingly, the photosensitive film 02 is directly formed on the layer farthest from the base substrate 01.

Under irradiation, the photosensitive resin material containing the azide may be decomposed to release nitrogen, so that a gap is generated between the photosensitive film 02 and a film layer in contact with the photosensitive film 02 (e.g., the base 03 formed subsequently on the photosensitive film 02), thereby easily separating the base 03 from the photosensitive film 02 during the subsequent manufacturing process.

In some embodiments, the photosensitive resin material containing the azide may be a photosensitive resin material containing azidonaphthalene compound. For example, in addition to the azide, the photosensitive resin material further contains a polyphenylene resin. For another example, the azidonaphthalene compound is 2-azidonaphthalene.

In some embodiments, the S101 includes: forming the photosensitive film 02 with a thickness of approximately 0.3 µm to approximately 8 µm on the glass substrate by using the photosensitive resin material containing the azidonaphthalene compound. For example, the thickness of the photosensitive film 02 is 0.3 µm, 0.5 µm, 1 µm, 3 µm, 5 µm, 7 µm, or 8 µm.

In some embodiments, the photosensitive resin material containing the azidonaphthalene compound is formed on the glass substrate 01 by a coating process, such as, slit coating or spin coating. After the coating is completed, the photosensitive resin material is pre-baked and then cured to form the photosensitive film 02 with the thickness of approximately 0.3 µm to approximately 8 µm.

In S102, as shown in part (b) of FIG. 2, a base 03 including an inorganic material is formed on the photosensitive film 02.

In some embodiments, the inorganic material included in the base 03 includes at least one of silicon nitride, silicon dioxide or silicon oxynitride. The base 03 is used to support an electronic device functional layer formed on the base 03 subsequently, and to protect the electronic device functional layer. The base 03 may be directly formed on the photosensitive film 02. Alternatively, the method further includes: forming one or more layers on the photosensitive film 02, and the base 03 is directly formed on the a layer farthest from the base 03.

In some embodiments, the S102 includes: forming the base 03 with a thickness of approximately 100 nm to approximately 1000 nm on the photosensitive film 02 by using an inorganic material including at least one of silicon nitride, silicon dioxide or silicon oxynitride. For example, the thickness of the base 03 is 100 nm, 200 nm, 300 nm, 400 nm, 500 nm, 600 nm, 700 nm, 800 nm, 900 nm or 1000 nm.

For example, forming the base 03 on the photosensitive film 02 by using an inorganic material including at least one of silicon nitride, silicon dioxide or silicon oxynitride, includes: forming at least one inorganic material layer with a total thickness of approximately 100 nm to approximately 1000 nm on the photosensitive film 02 by using an inorganic material including at least one of silicon nitride, silicon dioxide or silicon oxynitride by a chemical vapor deposition process (e.g., a plasma enhanced chemical vapor deposition (PECVD) process).

In a case where the at least one inorganic material layer includes two or more layers, materials of two adjacent inorganic material layers may be different. For example, the at least one inorganic material layer includes two inorganic material layers, a material of one inorganic material layer is silicon nitride, and a material of the other inorganic material layer is silicon oxynitride.

Herein, the photosensitive film 02 is made of the photosensitive resin material. That is, the photosensitive film 02 is an organic film. Therefore, in order to facilitate subsequent separation of the base 03 from the photosensitive film 02, the base 03 mainly includes an inorganic material instead of an organic material to avoid a problem of difficult separation between the organic film and an organic film.

In S103, as shown in part (c) of FIG. 2, an electronic device functional layer 04 is formed on the base 03.

The electronic device functional layer 04 is a main component of the flexible device to realize its function, and may include a plurality of pattern layers, electronic elements, and the like. According to a type and or application of the flexible device, the pattern layers and the electronic elements included in the electronic device functional layer 04 may be different. For example, the flexible device is a backlight in a liquid crystal display apparatus, and the electronic elements are mini light-emitting diodes (Mini LEDs) or micro light-emitting diodes (Micro LEDs). For another example, the flexible device is an OLED display panel, and the electronic elements are organic light-emitting diodes (OLED).

The electronic device functional layer 04 may be directly formed on the base 03. Alternatively, the method further includes: forming one or more layers on the base 03, and the electronic device functional layer 04 is directly formed on a layer farthest from the base 03.

In S104, as shown in part (d) of FIG. 2, an encapsulation layer 05 is formed on the electronic device functional layer 04. After the encapsulation layer 05 is formed, the manufacture of the flexible device may be completed.

The encapsulation layer 05 may be directly formed on the electronic device functional layer 04. Alternatively, the method further includes: forming one or more layers on the electronic device functional layer 04, and the encapsulation layer 05 is directly formed on a layer farthest from the electronic device functional layer 04.

In some embodiments, the S104 includes: forming an encapsulation layer 05 with a thickness of approximately 5 μm to approximately 100 μm on the electronic device functional layer 04 by using silicone rubber. For example, the thickness of the encapsulation layer 05 is 5 μm, 10 μm, 20 μm, 30 μm, 40 μm, 50 μm, 60 μm, 70 μm, 80 μm, 90 μm or 100 μm.

In some embodiments, the silicone rubber is coated on the electronic device functional layer 04 by a coating process, such as slit coating or spin coating, and then the silicone rubber is cured to form the encapsulation layer 05.

The silicone rubber is a semiorganic synthetic. Its structure consists of a chain of silicon and oxygen atoms. The silicone rubber has advantages of high-temperature resistance, low-temperature resistance, weathering resistance, excellent insulativity, corona resistance, arc resistance, oil resistance, solvent resistance and the like. Therefore, the encapsulation layer 05 including the silicone rubber has obvious advantages.

In addition, the encapsulation layer 05 including the silicone rubber is a fully transparent layer, which is particularly suitable for a transparent flexible device. For example, with regard to the transparent flexible device, the encapsulation layer 05 including the silicone rubber may ensure that the flexible device has a better light transmittance.

In S105, as shown in part (e) of FIG. 2, the photosensitive film 02 is irradiated at a side of the base substrate 01 away from the encapsulation layer 05. Under irradiation, the azide in the photosensitive film 02 releases gas, so that a gap is generated between the photosensitive film 02 and the base 03.

The azide in the photosensitive film 02 is decomposed after irradiation, and the released gas is nitrogen ($N_2$).

Figure 3:
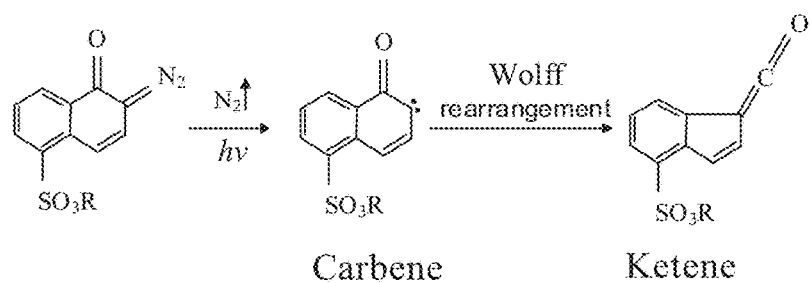
FIG. 3 is a diagram showing photodecomposition of a photosensitive resin, according to some embodiments of the present disclosure.

For example, the azide in the photosensitive film 02 is azidonaphthalene compound. As shown in FIG. 3, which is a reaction mechanism diagram of decomposition of the azidonaphthalene compound under irradiation, a photosensitive group of the azidonaphthalene compound is dissociated under irradiation to generate carbene and release nitrogen ($N_2$), and then ketene is obtained by performing a wolff rearrangement on carbene.

In some embodiments, the photosensitive film 02 is irradiated with ultraviolet light at a side of the base substrate 01 away from the encapsulation layer 05.

In S106, as shown in part (f) of FIG. 2, an entire structure including the base 03, and the electronic device functional layer 04 and the encapsulation layer 05 that have been formed on the base 03 are peeled off from the photosensitive film 02.

Figure 4:
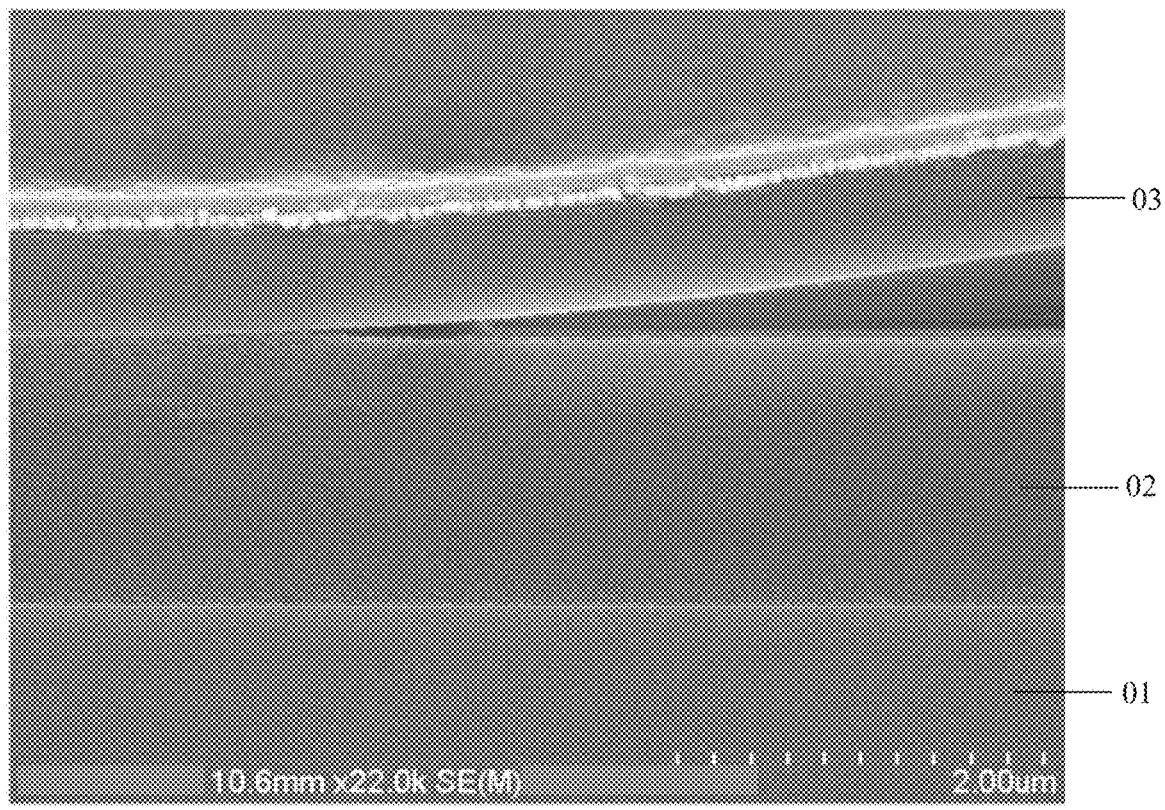
FIG. 4 is a scanning electron microscope diagram of a flexible device, according to some embodiments of the present disclosure.

Since in the S105, the azide in the photosensitive film 02 is photodecomposed and a gas is generated, a gap is generated between the photosensitive film 02 and the base 03 due to the gas, so that adhesive force between the base 03 and the photosensitive film 02 is significantly reduced, thereby ensuring that the base 03 and the photosensitive film 02 may be effectively separated from each other without damage in the S106 (referring to the scanning electron microscope diagram shown in FIG. 4).

In some embodiments, the S106 includes: pulling up the encapsulation layer 05 from an edge of the base substrate 01 to peel off the base 03 from the photosensitive film 02.

Figure 5:
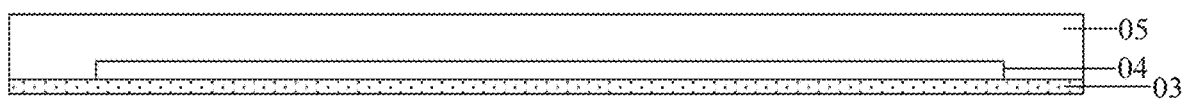
FIG. 5 is a schematic diagram showing a structure of a flexible device, according to some embodiments of the present disclosure.

As shown in FIG. 5, after the base 03 is peeled off from the photosensitive film 02, the manufacture of the flexible device 001 is completed.

In the related art, during manufacturing the flexible device, a PI film is used as a base to form a flexible device, and since the PI film needs to be cured at a high temperature of above 400° C., high-temperature glass substrate needs to be used as a base substrate and the PI film is formed on the high-temperature glass substrate. On this basis, in order to support the flexible device, a thickness of the PI film (5 μm to 60 μm) is large, and a stress of the PI film is large. Therefore, the high-temperature glass substrate is easily caused to be deformed excessively to fragment in the manufacturing process.

In the method of manufacturing the flexible device 001 provided by some embodiments of the present disclosure, the photosensitive film 02 including the azide is formed on the hard base substrate 01, then the flexible device with the inorganic film as the base 03 is formed on the photosensitive film 02, finally the photosensitive film 02 is irradiated, and the gas generated from the decomposition of the azide in the photosensitive film 02 causes a gap between the photosensitive film 02 and the base 03, thereby separating the flexible device 001 from the base 03. Compared with the related art, the method of manufacturing the flexible device 001 provided by some embodiments of the present disclosure may avoid various disadvantages caused by using the PI film as the base of the flexible device 001.

Compared with the related art in which the PI film is used as the base and a thickness of the PI film is in a range from 5 µm to 60 µm, a thickness of the base 03 including inorganic material provided by the embodiments of the present disclosure is in a range from approximately 100 nm to approximately 1000 nm. In a case where the base 03 with a small thickness is used, since the thickness of the encapsulation layer 05 is large in practice (for example, in a range from 5 µm to 100 µm), the flexible device 001 itself does not curl even if the thickness of the base 03 is small.

With regard to different flexible devices 001, specific structures of the electronic device functional layers 04 formed in the S103 are different.

Figure 6:
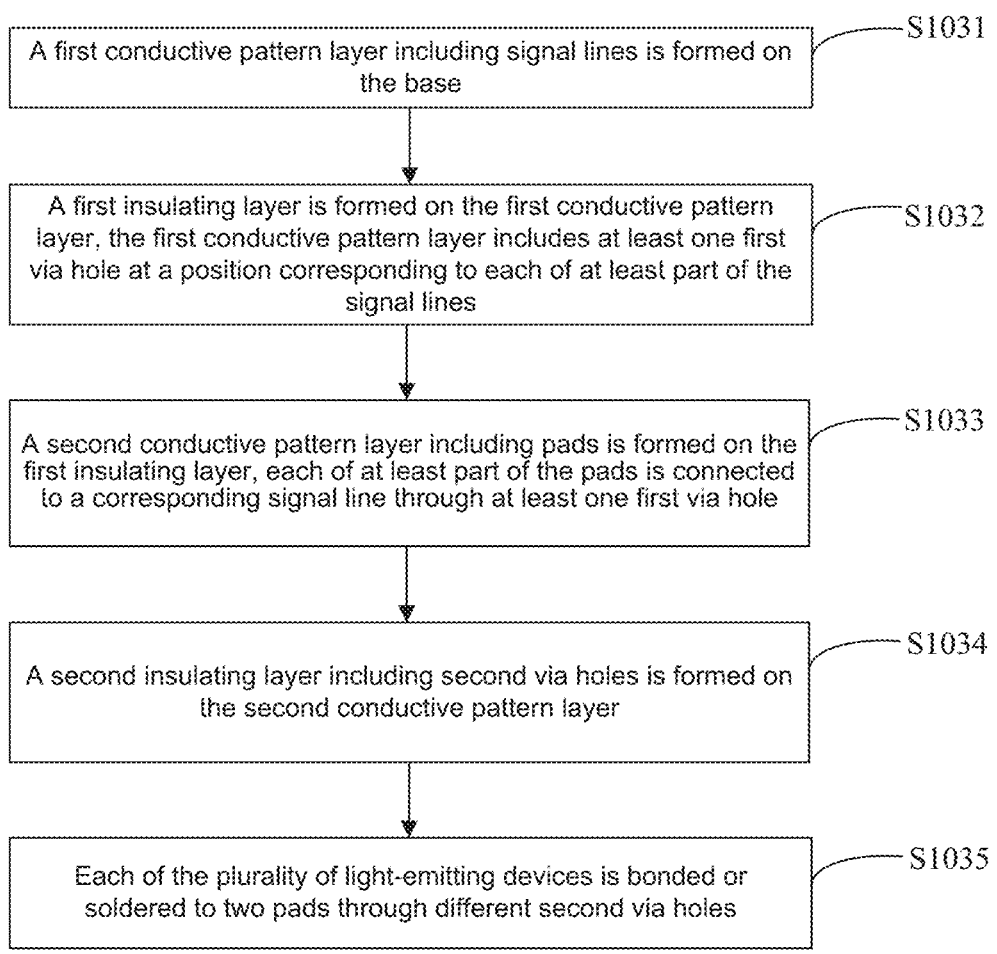
FIG. 6 is a flow diagram of a method of forming an electronic device functional layer in a flexible device, according to some embodiments of the present disclosure.

The electronic device functional layer 04 formed in the S103 is further described below by taking the flexible device 001 being a flexible backlight in the liquid crystal display apparatus as an example. Referring to the plan view shown in FIG. 7A and the section shown in FIG. 8, as shown in FIG. 6, the S103 may include S1031 to S1035.

Figure 7A:
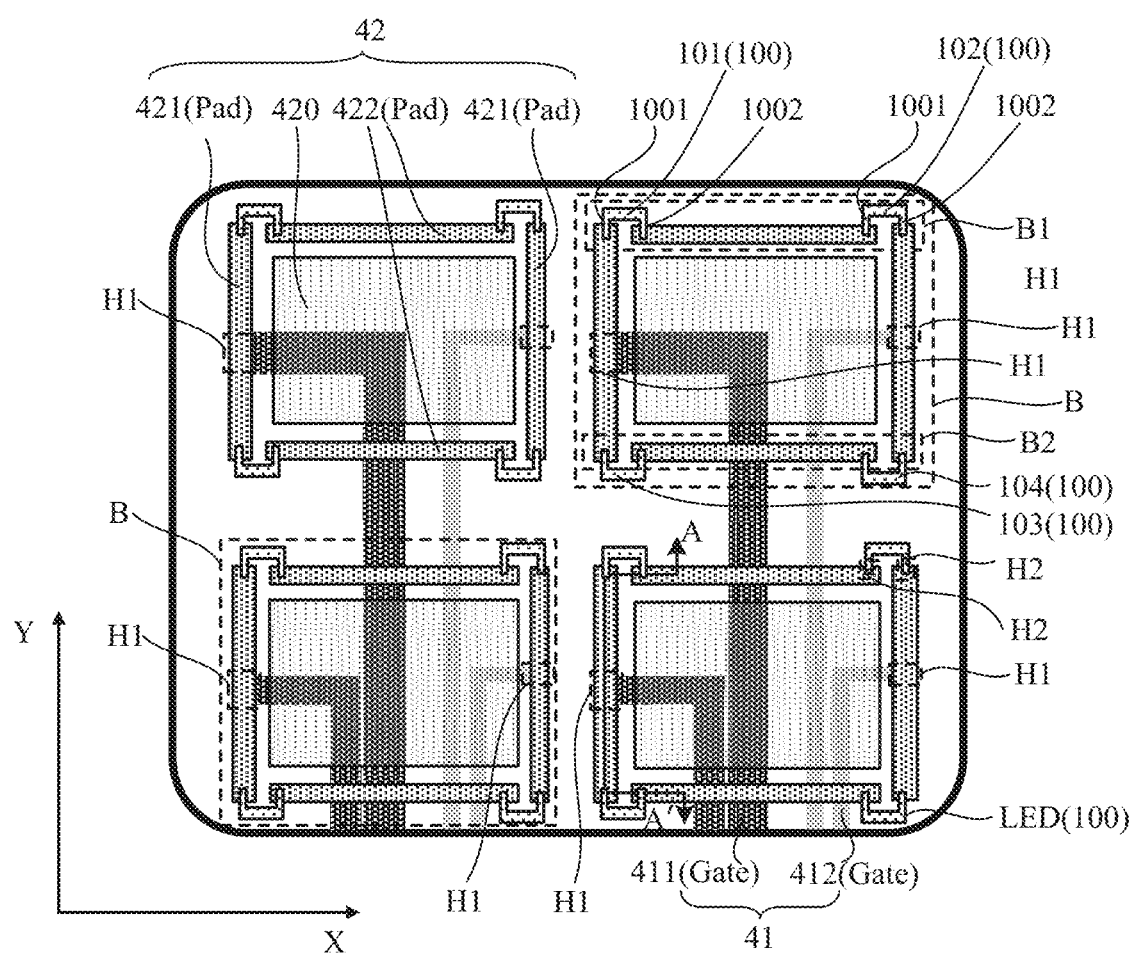
FIG. 7A is a schematic plan view of a backlight, according to some embodiments of the present disclosure.
Figure 8:
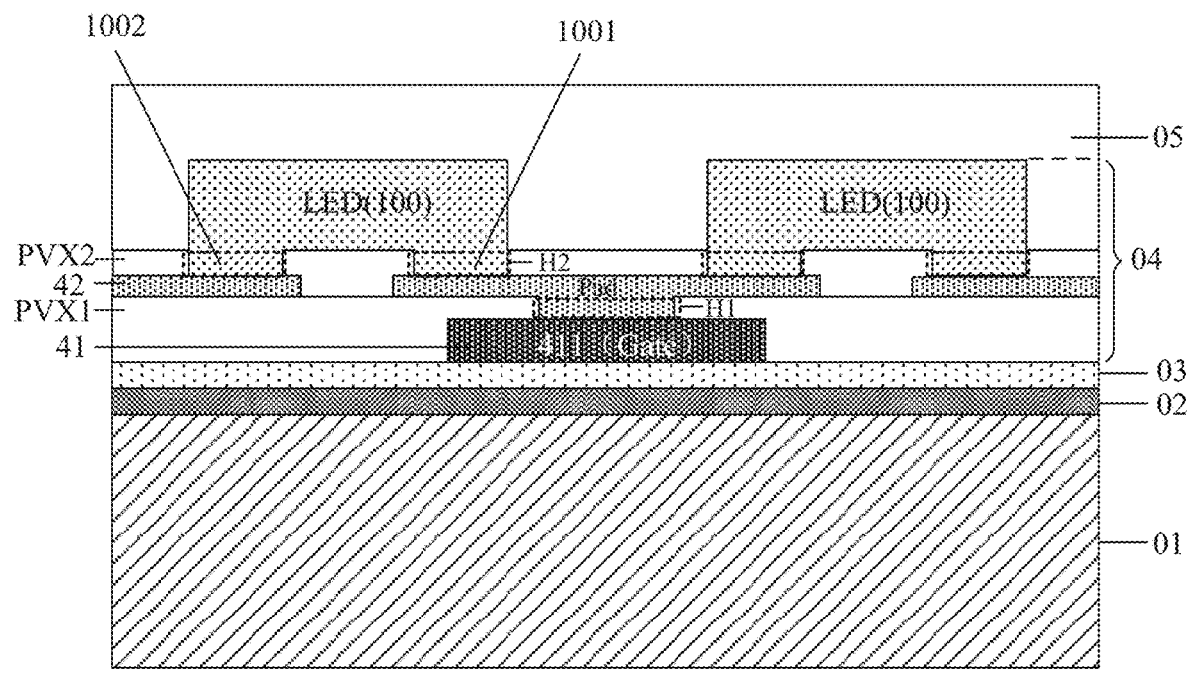
FIG. 8 is a section of the backlight along a section line (labeled as AA') in FIG. 7A, according to some embodiments of the present disclosure.

In S1031, as shown in FIGS. 7A and 8, a first conductive pattern layer 41 including signal lines Gate is formed on the base 03.

The signal lines Gate in the first conductive pattern layer 41 may include signal lines with a plurality of different functions, that is, the signal lines Gate may include signal lines for transmitting different types of electrical signals. For example, the signal lines Gate includes signal lines for transmitting two different voltages (e.g., anode wires 411 for transmitting high voltages and cathode wires 412 for transmitting low voltages as shown in FIG. 7A). FIG. 8 is only a schematic local section, not showing all of the signal lines. Other related signal lines may be referred to FIG. 7A. In practice, the signal lines may also be set according to needs, which is not limited herein.

For example, the S1031 includes: forming a copper film with a thickness of approximately 2 µm to approximately 100 µm on the base 03 by using copper (Cu), and patterning the copper film through processes such as exposure, development, etching and stripping (i.e., through a single patterning process) to form the first conductive pattern layer 41 including the signal lines Gate. For example, a thickness of the copper film is 2 µm, 5 µm, 10 µm, 20 µm, 30 µm, 40 µm, 50 µm, 60 µm, 70 µm, 80 µm, 90 µm or 100 µm. The thicker signal line Gate may have a small resistance, thereby reducing power consumption. In addition, a current passing through the thicker signal line Gate may large, thereby improving luminance of the flexible device 001 serving as the backlight.

In some other embodiments, the S1031 includes: sequentially forming a first molybdenum-niobium alloy film, a copper film with a thickness of approximately 2 µm to 100 µm, and a second molybdenum-niobium alloy film on the base 03 in a thickness direction of the base 03, and patterning the second molybdenum-niobium alloy film, the thick copper film and the first molybdenum-niobium alloy film through processes such as exposure, development, etching and stripping (i.e., through a single patterning process) to form the first conductive pattern layer 41 including the signal lines Gate. That is, each signal line has a laminated structure of molybdenum-niobium alloy, copper, and molybdenum-niobium alloy. The molybdenum-niobium alloy may improve adhesive force between the copper film and other layers, and the molybdenum-niobium alloy may prevent the copper film from being oxidized.

For example, each of the molybdenum-niobium alloy layer and the copper film is deposited by using a corresponding sputter-coating process.

In S1032, as shown in FIGS. 7A and 8, a first insulating layer PVX1 is formed on the first conductive pattern layer 41. The first conductive pattern layer 41 includes at least one first via hole H1 at a position corresponding to each of at least part of the signal lines Gate.

In some embodiments, a first insulating film is formed on the first conductive pattern layer 41 by using an inorganic insulating material, such as silicon nitride or silicon dioxide, and the first insulating film is patterned through processes such as exposure, development, etching and stripping to form the first insulating layer PVX1 including at least one first via hole H1 at a position corresponding to each of at least part of the signal lines Gate. For example, as shown in FIGS. 7A and 8, at least one first via hole H1 is disposed in the first insulating layer PVX1 at a position corresponding to each anode wire 411, and at least one first via hole H1 is disposed in the first insulating layer PVX1 at a position corresponding to each cathode wire 412.

For example, the first insulating film including the inorganic insulating material may be formed through a chemical vapor deposition process (e.g., PECVD process).

In S1033, as shown in FIGS. 7A and 8, a second conductive pattern layer 42 including pads is formed on the first insulating layer PVX1. Each of at least part of the pads is connected to a corresponding signal line Gate through at least one first via hole H1.

For example, the pads are divided into a plurality of pad groups, and each pad group includes two pads. One of the two pads is connected to a corresponding anode wire 411 through at least one first via hole H1, and the other pad is connected to a corresponding cathode wire 412 through at least one first via hole H1.

For example, as shown in FIGS. 7A and 8, the pads includes a plurality of first pads 421 and a plurality of second pads 422. Each first pad 421 extends in a first direction (e.g., the Y direction shown in FIG. 7A), and each second pad 422 extends in a second direction (e.g., the X direction shown in FIG. 7A). One first pad 421 is connected to a corresponding anode wire 411 through at least one first via hole H1. Another first pad 421 is connected to a corresponding cathode wire 412 through at least one first via hole H1.

It will be noted that shapes of the first pads 421 and the second pads 422 that are shown in FIG. 7A are merely an example, and shapes of the first pads 421 and the second pads 422 may be other shapes as long as the first pad 421 extends in the first direction as a whole, and the second pad 422 extends in the second direction as a whole.

The pad may have both conductive properties and light reflection properties.

In some embodiments, the S1033 includes: forming a conductive reflective film on the first insulating layer PVX1 by using a conductive reflective material, and patterning the conductive reflective film to form the second conductive pattern layer 42 including the pads. The conductive reflective material is an opaque metal material, such as silver or aluminum.

Figure 9A:
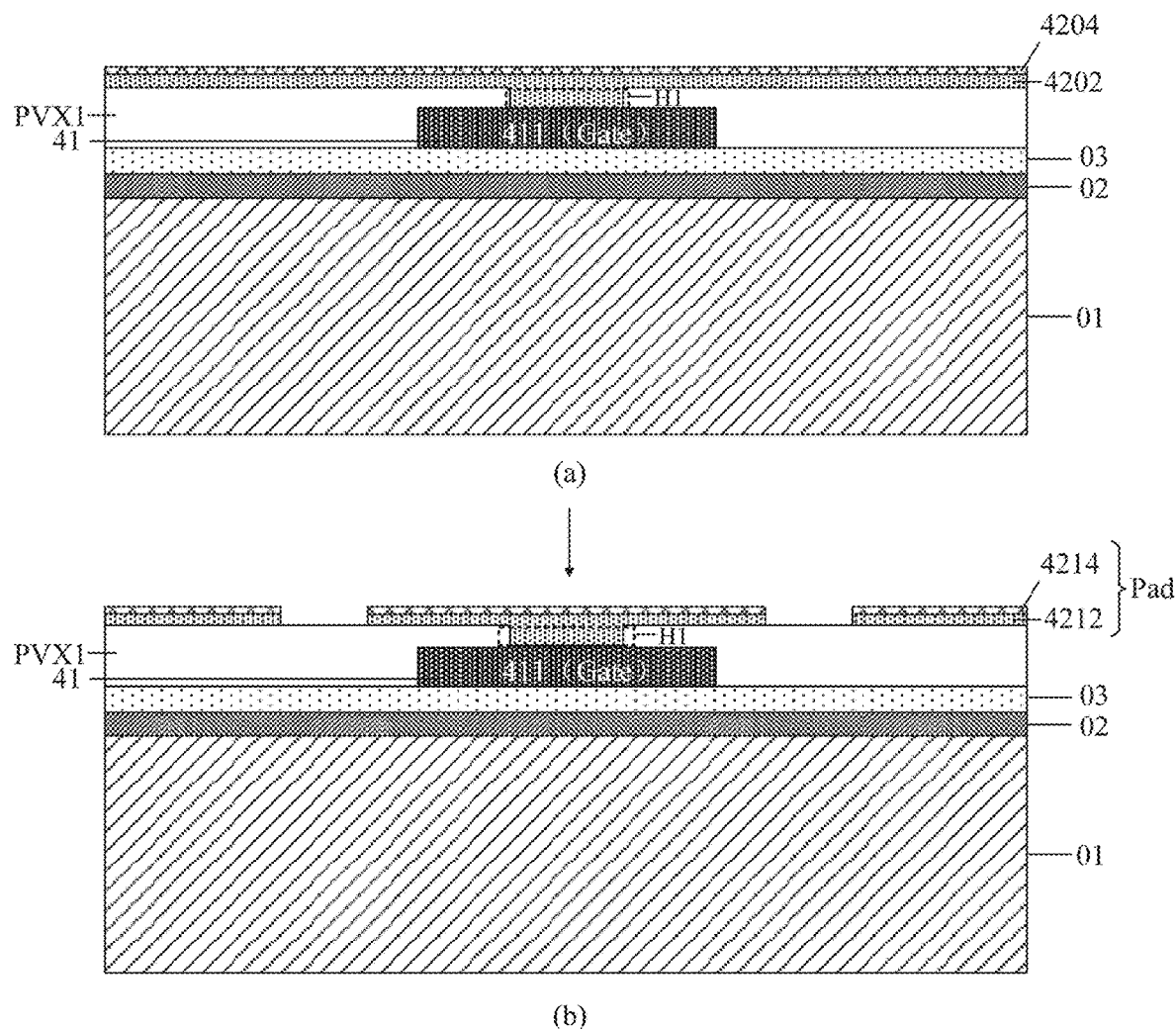
FIG. 9A is a schematic diagram of a process of forming a second conductive pattern layer in a flexible device, according to some embodiments of the present disclosure.

In some other embodiments, the S1033 includes: as shown in part (a) of FIG. 9A, sequentially forming a metal reflective film 4202 and a transparent conductive protective film 4204 on the first insulating layer PVX1, and performing a single patterning process on the metal reflective film 4202 and the transparent conductive protective film 4204 to form the second conductive pattern layer 42 including the pads. As shown in part (b) of FIG. 9A, each pad includes a metal reflective sub-pattern 4212 and a transparent conductive protective sub-pattern 4214 that are stacked in a thickness direction of the base 03.

For example, the step of sequentially forming a metal reflective film 4202 and a transparent conductive protective film 4204 on the first insulating layer PVX1, includes: sequentially forming a silver (Ag) film and an indium tin oxide (ITO) film on the first insulating layer PVX1. A thickness of the Ag film may be in a range from approximately 50 nm to approximately 100 nm, such as, 50 nm, 60 nm, 70 nm, 80 nm, 90 nm or 100 nm. A thickness of the ITO film may be in a range from 8 nm to 20 nm, such as, 8 nm, 10 nm, 12 nm, 14 nm, 16 nm or 20 nm. Then, a single patterning process (including processes such as exposure, development, etching and stripping) is performed on the ITO film and the Ag film to form the second conductive pattern layer 42 including the pads. The pad includes an Ag reflective sub-pattern and an ITO protective sub-pattern that are stacked in the thickness direction of the base 03.

Figure 9B:
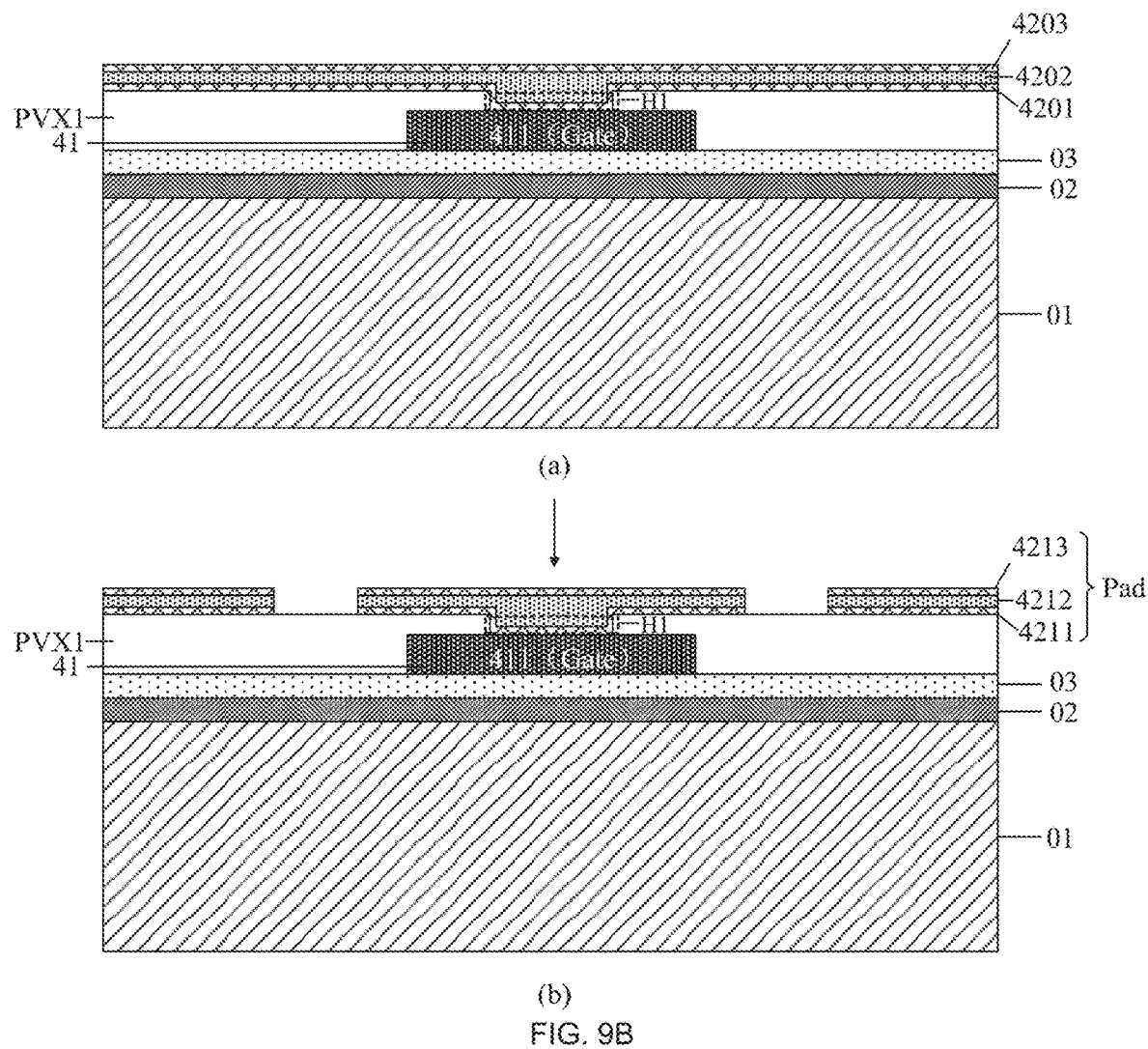
FIG. 9B is a schematic diagram of a process of forming a second conductive pattern layer in another flexible device, according to some embodiments of the present disclosure.

In some other embodiments, the 31033 includes: as shown in part (a) of FIG. 9B, sequentially forming a first transparent conductive protective film 4201, the metal reflective film 4202 and a second transparent conductive protective film 4203 on the first insulating layer PVX1, and performing a single patterning process on the first transparent conductive protective film 4201, the metal reflective film 4202, and the second transparent conductive protective film 4203 to form the second conductive pattern layer 42 including the pads. As shown in part (b) of FIG. 9B, the pad includes a first transparent conductive protective sub-pattern 4211, a metal reflective sub-pattern 4212 and a second transparent conductive protective sub-pattern 4213, all of which are stacked in the thickness direction of the base 03.

For example, the step of sequentially forming a first transparent conductive protective film 4201, the metal reflective film 4202 and a second transparent conductive protective film 4203 on the first insulating layer PVX1, includes: sequentially forming an ITO film, an Ag film and an ITO film on the first insulating layer PVX1. The thickness of the ITO film may be in a range from approximately 8 nm to approximately 20 nm, such as, 8 nm, 10 nm, 12 nm, 14 nm, 16 nm or 20 nm. The thickness of the Ag film may be in a range from approximately 50 nm to approximately 100 nm, such as, 50 nm, 60 nm, 70 nm, 80 nm, 90 nm or 100 nm. For example, the ITO film, the Ag film and the ITO film may be sequentially deposited on the first insulating layer PVX1 through sputter-coating processes. Then, a single patterning process (including processes such as exposure, development, etching and stripping) is performed on the ITO film, the Ag film and the ITO film to form the second conductive pattern layer 42 including the pads. The pad includes a first ITO protective sub-pattern, an Ag reflective sub-pattern and a second ITO protective sub-pattern, all of which are stacked in the thickness direction of the base 03.

The Ag reflective sub-pattern is mainly used for conducting electricity and reflecting light. The ITO protective sub-pattern is mainly used for protecting the Ag reflective sub-pattern and preventing the Ag reflective sub-pattern from being oxidized.

In some embodiments, as shown in FIG. 7A, the S1033 includes: forming a second conductive pattern layer 42 including the plurality of first pads 421, the plurality of second pads 422 and a plurality of reflective patterns 420 on the first insulating layer PVX1. Each first pad 421 extends in the first direction (e.g., the Y direction shown in FIG. 7A), each second pad 422 extends in the second direction (e.g., the X direction shown in FIG. 7A), and the first direction is perpendicular to the second direction. In the first direction, at least two rows of second pads 422 are disposed between every two first pads 421 adjacent to each other in the second direction, and each row of second pads 422 includes at least one second pad 422 arranged in the second direction. Each reflective pattern 420 is formed in a region surrounded by two adjacent rows of second pads 422 and two adjacent first pads 421. The reflective pattern 420 is insulated from both the first pads 421 and the second pads 422.

The reflective pattern 420 may reflect light, so that light emitted by light-emitting device(s) is reflected by the reflective pattern 420 when reaching the reflective pattern 420, thereby improving light extraction efficiency of the flexible device 001.

Each pad may provide an electrical signal from a corresponding signal line Gate to a light-emitting device connected to the pad. In addition, the pad may also be used as a reflective layer to reflect light directed to the pad by the light-emitting device to improve light extraction efficiency of the backlight.

Figure 10:
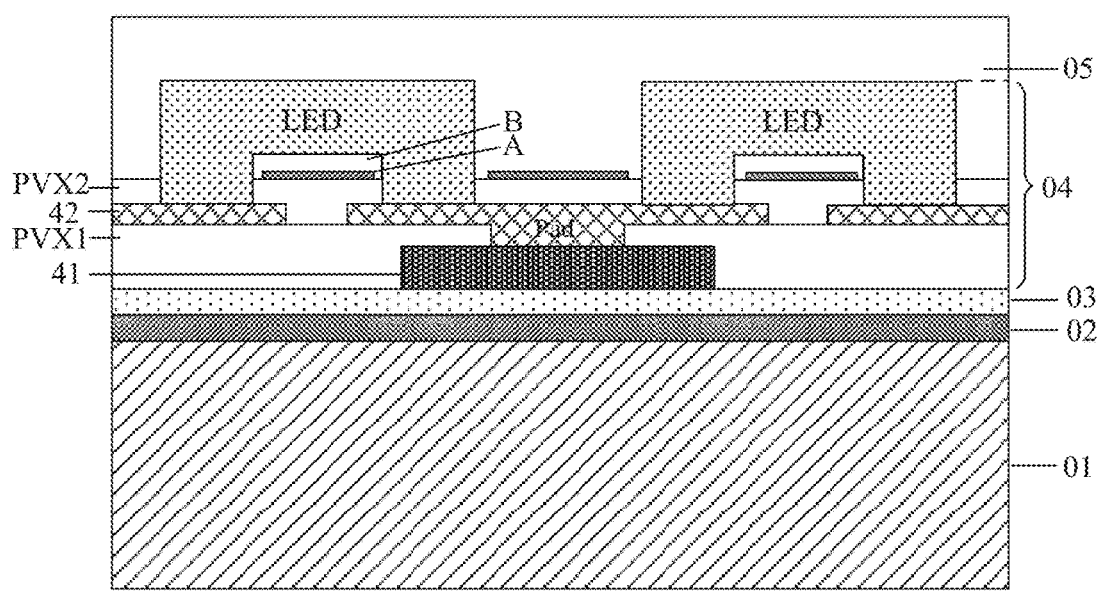
FIG. 10 is a local section of a backlight in the related art.

In the related art, as shown in FIG. 10, in order to achieve a same light extraction effect, pads, a reflective layer A and a protective layer B are separately formed through different patterning processes. Relative to the related art, in some embodiments of the present disclosure, the pads and the reflective patterns 420 are formed through a single patterning process, and the number of patterning processes may be reduced, thereby reducing manufacturing costs.

In S1034, as shown in FIGS. 7A and 8, a second insulating layer PVX2 including second via holes H2 is formed on the second conductive pattern layer 42.

In some embodiments, the S1034 includes: forming a second insulating film on the second conductive pattern layer 42 by using an inorganic insulating material such as silicon nitride or silicon dioxide, and patterning the second insulating film through processes such as exposure, development, etching and stripping to form the second insulating layer PVX2 including the second via holes H2.

In some embodiments, in a case where the pads are divided into a plurality of pad groups, each pad group includes two pads, one of the two pads is connected to a corresponding anode wire 411 through at least one first via hole H1, and the other is connected to a corresponding cathode wire 412 through at least one first via hole H1, the second insulating layer PVX2 has a second via hole H2 at a position corresponding to each pad.

In some other embodiments, as shown in FIG. 7A, a plurality of second via holes H2 may be provided in the second insulating layer PVX2 at a position corresponding to each pad.

For example, the second insulating film of the inorganic insulating material may be formed through a chemical vapor deposition process (e.g., a PECVD process).

In S1035, each of the plurality of light-emitting devices 100 is bonded or soldered to two pads through different second via holes H2.

The light-emitting device 100 is, for example, a Mini LED or a Micro LED.

A backlight with the Mini LED or the Micro LED may be applied to a ultra-small space distance display screen or a ultra-thin display screen. In addition, the backlight with the Mini LED or the Micro LED may be designed as a direct-type backlight with local dimming function, which has better light uniformity, higher contrast ratio and more light and dark details than an ordinary edge-type backlight.

In addition, a liquid crystal display panel in which the backlight includes the Mini LED or the Micro LED has better color rendering index, and a thickness of the liquid crystal display panel may be the same as or similar to a thickness of an OLED display panel.

In some embodiments, the light-emitting device 100 is soldered to two different pads through two second via holes H2 corresponding to the two pads. For example, as shown in FIG. 7A, the light-emitting device 100 includes an anode 1001 and a cathode 1002. The anode 1001 of the light-emitting device 100 is soldered to one pad through a second via hole H2 corresponding to the pad. The cathode 1002 of the light-emitting device 100 is soldered to the other pad through a second via hole H2 corresponding to the other pad.

As shown in FIG. 7A, in some embodiments, the plurality of light-emitting devices 100 may be divided into a plurality of groups that are arranged in an array, and each group includes at least four light-emitting devices 100. The at least four light-emitting devices 100 are divided into at least two subgroups, each subgroup includes at least two light-emitting devices 100 connected in series through a row of second pads 422, and the at least two subgroups are connected in parallel through two first pads 421 adjacent to each other in the second direction.

For example, as shown in FIG. 7A, each group of light-emitting devices 100 includes four light-emitting devices 100. A cathode 1002 of a first light-emitting device 100 (labeled as 101 in FIG. 7A) of the four light-emitting devices 100 is connected to one second pad 422. An anode 1001 of a second light-emitting device 100 (labeled as 102 shown in FIG. 7A) is also connected to the second pad 422, so that the first light-emitting device 101, the second pad 422 and the second light-emitting device 102 are connected in series to form a subgroup (dashed box indicated by B1 shown in FIG. 7A). A cathode 1002 of a third light-emitting device 100 (labeled as 103 shown in FIG. 7A) of the four light-emitting devices 100 is connected to another second pad 422. An anode 1001 of a fourth light-emitting device 100 (labeled as 104 shown in FIG. 7A) is also connected to the another second pad 422, so that the third light-emitting device 103, the another second pad 422 and the fourth light-emitting device 104 are connected in series to form a subgroup (dashed box indicated by B2 shown in FIG. 7A). Then, the anode 1001 of the first light-emitting device 101 and the anode 1001 of the third light-emitting device 103, which are in two subgroups (B1 and B2 in FIG. 7A), are connected to one first pad 421, and the cathode 1002 of the second light-emitting device 102 and the cathode 1002 of the fourth light-emitting device 104, which are in the two subgroups, are connected to another first pad 421, so that the two subgroups are connected in parallel. A region where each group of light-emitting devices 100 is located is a light-emitting sub-region B. Only four light-emitting sub-regions B are shown in FIG. 7A, and the number of light-emitting sub-regions B included in the flexible device 001 is not limited thereto.

On this basis, an anode wire 411 and a cathode wire 412 may be provided for each light-emitting sub-region B, and the anode wire 411 and the cathode wire 412 are connected to two first pads 421 in the group of light-emitting devices. As a result, each light-emitting sub-region B may be driven individually, and there is no need to provide an anode wire 411 and a cathode wire 412 for each light-emitting device 100, which may reduce the number of the signal lines Gate in the first conductive pattern layer 41.

Figure 7B:
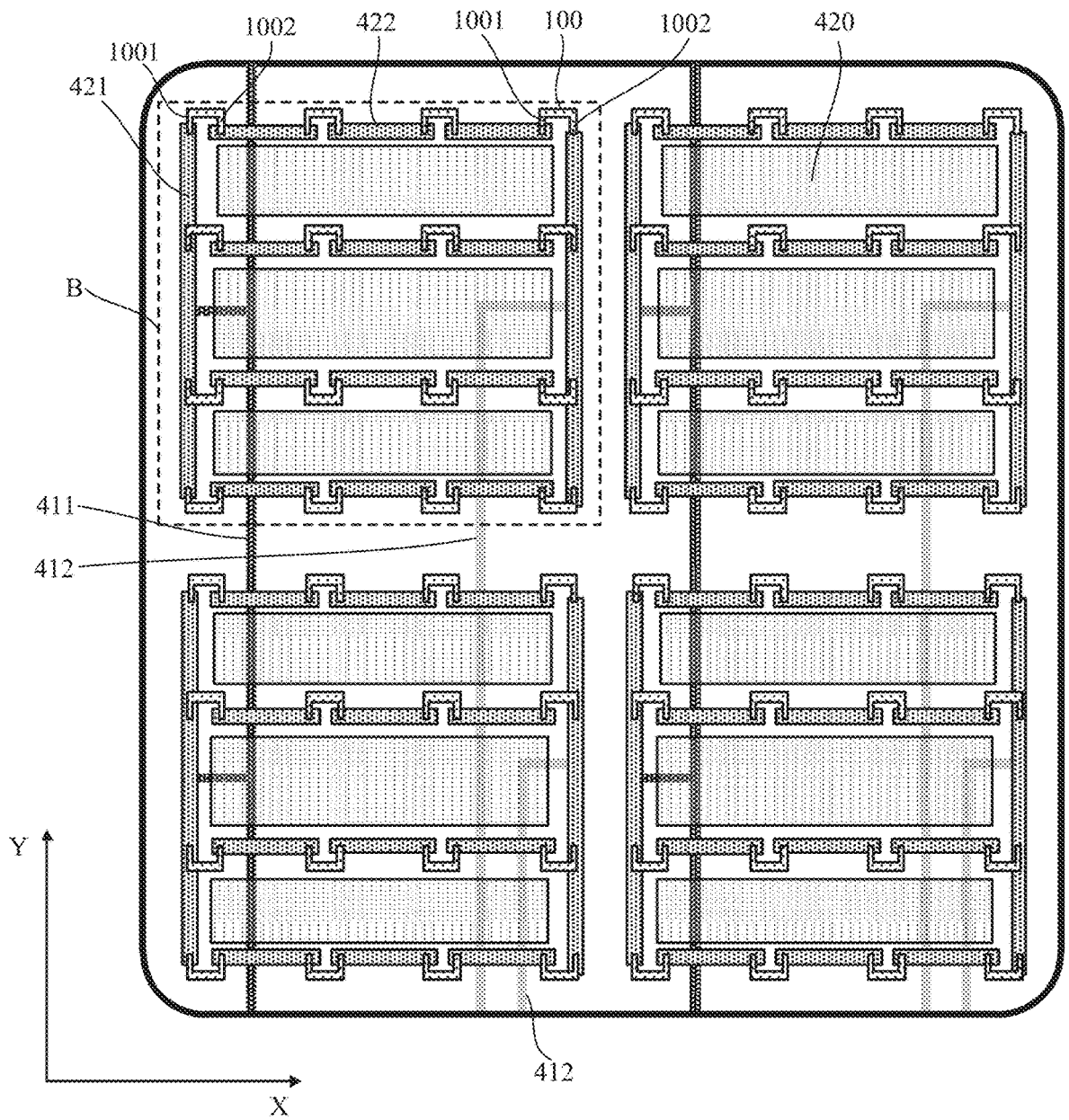
FIG. 7B is a schematic plan view of another backlight, according to some embodiments of the present disclosure.
Figure 7C:
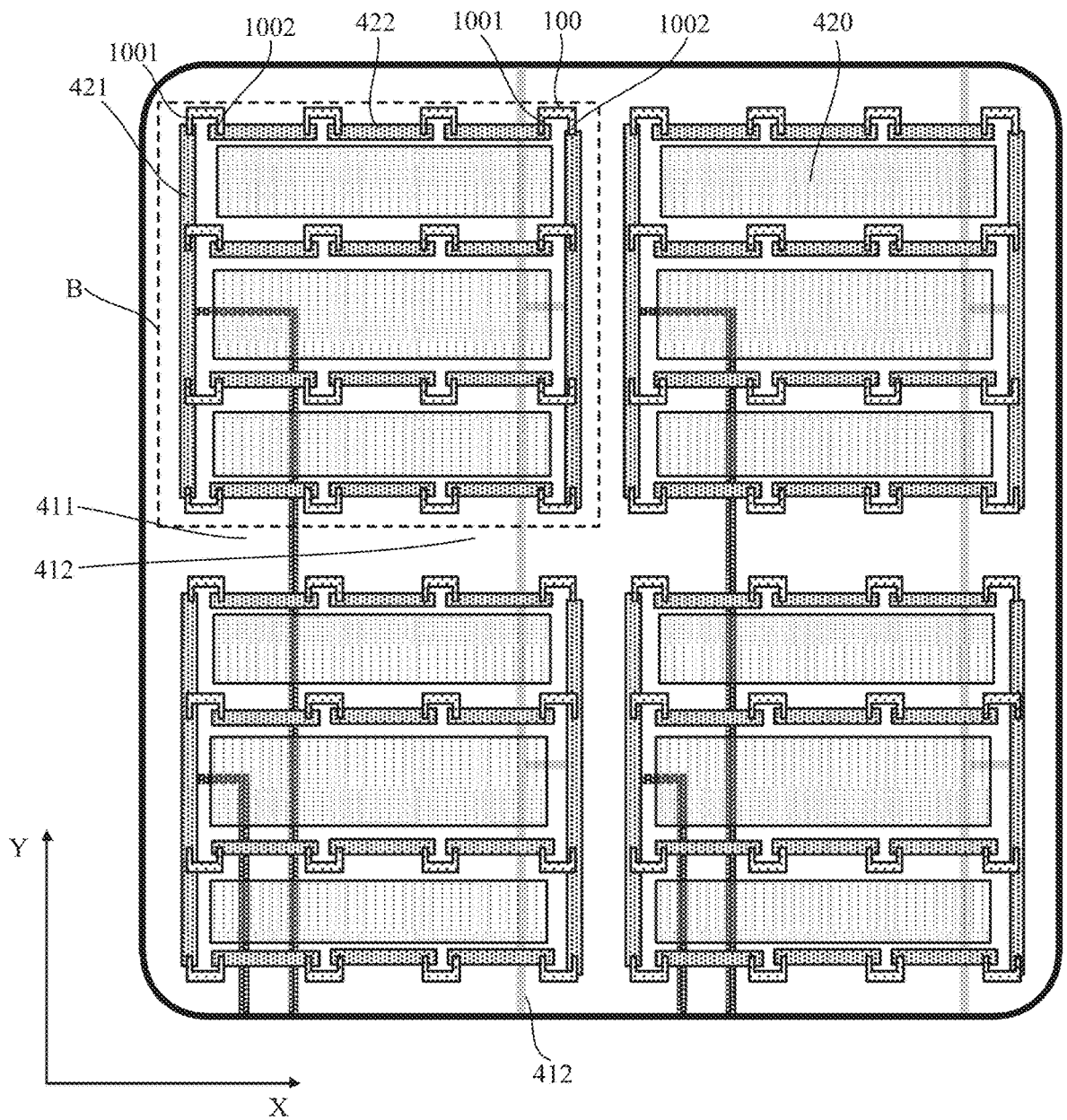
FIG. 7C is a schematic plan view of yet another backlight, according to some embodiments of the present disclosure.

The above is described by taking an example in which two light-emitting devices 100 are connected in series to form a subgroup, and two subgroups are connected in parallel to form a group disposed in a light-emitting sub-region B. Of course, more than two light-emitting devices 100 may be connected in series to form a sub-group, and more than two sub-groups may be connected in parallel to form a group disposed in a light-emitting sub-region B. For example, as shown in FIGS. 7B and 7C, four light-emitting devices 100 are connected in series to form a sub-group, and four sub-groups are connected in parallel to form a group disposed in a light-emitting sub-region B. The number of light-emitting devices 100 connected in series in the sub-group in the light-emitting sub-region B is not limited, and the number of sub-groups connected in parallel in the light-emitting sub-region B is also not limited.

In some embodiments, as shown in FIG. 7B, a row of light-emitting sub-regions B arranged in the first direction (e.g., the Y direction shown in FIG. 7B) corresponds to an anode wire 411, and each light-emitting sub-regions B in the row of light-emitting sub-regions B corresponds to a respective one of the cathode wires 412. By controlling a voltage on each cathode wire 412, light emission condition of the light-emitting devices 100 in the light-emitting sub-region B is controlled.

In some other embodiments, as shown in FIG. 7C, a row of light-emitting sub-regions B arranged in the first direction (e.g., the Y direction shown in FIG. 7C) corresponds to a cathode wire 412, and each light-emitting sub-region B in the row of light-emitting sub-regions B corresponds to a respective one of the anode wires 411. By controlling a voltage on each anode wire 411, light emission condition of the light-emitting devices 100 in the light-emitting sub-region B is controlled. In this way, the number of signal lines Gate in the first conductive pattern layer 41 may be further reduced.

Some embodiments of the present disclosure provide a flexible device 001, which may be manufactured by using the method of manufacturing the flexible device in any embodiment described above. As shown in FIG. 5, the flexible device 001 includes the base 03, the encapsulation layer 05, and the electronic device functional layer 04 disposed between the base 03 and the encapsulation layer 05. The material of the base 03 is an inorganic material, and the thickness of the base 03 is in a range from approximately 100 nm to approximately 1000 nm, such as, 100 nm, 200 nm, 300 nm, 400 nm, 500 nm, 600 nm, 700 nm, 800 nm, 900 nm or 1000 nm. The thickness of the encapsulation layer 05 is in a range from approximately 5 μm to approximately 100 μm, such as, 5 μm, 10 μm, 20 μm, 30 μm, 40 μm, 50 μm, 60 μm, 70 μm, 80 μm, 90 μm or 100 μm. The base 03 is used to insulate and protect the electronic device functional layer 04, and the encapsulation layer 05 is used to support and protect the whole flexible device 001.

Compared with the PI film with a thickness of 5 μm to 60 μm used as a base in related art, the thickness of the base 03 in the flexible device 001 of the embodiments of the present disclosure is obviously reduced. In addition, in the flexible device 001 in the embodiments of the present disclosure, the encapsulation layer 05 with a large thickness is mainly used as a support layer, so that flatness of the flexible device 001 may be ensured. In addition, the base 03 in the flexible device 001 of the embodiments of the present disclosure includes an inorganic material, which avoids various disadvantages caused by using the PI film as the base in the related art.

In some embodiments, the encapsulation layer 05 includes silicon rubber.

In some embodiments, the inorganic material included in the base 03 includes at least one of silicon nitride, silicon dioxide or silicon oxynitride.

In addition, in an example where the flexible device 001 is the flexible backlight in the liquid crystal display apparatus, an arrangement manner of the electronic device functional layer 04 will be further described below.

Figure 11:
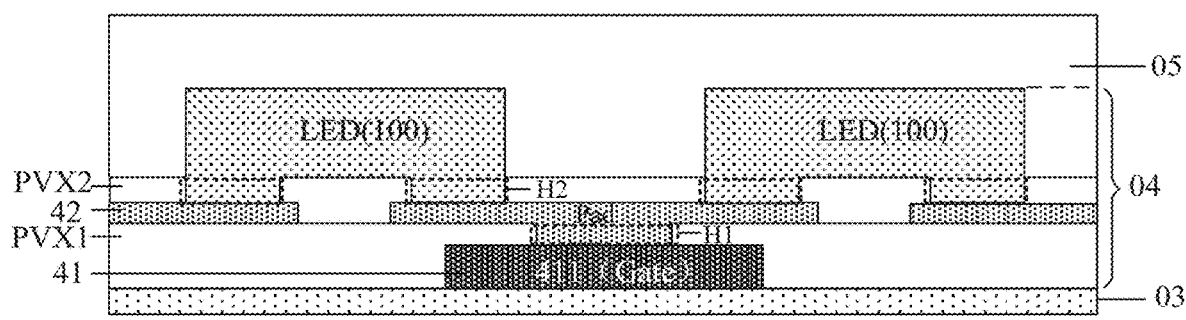
FIG. 11 is a schematic diagram showing a structure of another flexible device, according to some embodiments of the present disclosure.

In some embodiments, as shown in FIGS. 7A and 11, in the backlight (i.e., the flexible device 001), the electronic device functional layer 04 includes the first conductive pattern layer 41, the first insulating layer PVX1, the second conductive pattern layer 42, the second insulating layer PVX2 and the plurality of light-emitting devices 100, all of which are sequentially stacked in a direction away from the base 03 toward the encapsulation layer 05. The first conductive pattern layer 41 includes signal lines Gate. The first conductive pattern layer 41 includes at least one first via hole H1 at a position corresponding to each of at least part of the signal lines Gate. The second conductive pattern layer 42 includes pads, and each of at least part of the pads is connected to a corresponding signal line Gate through at least one first via hole H1. The second insulating layer PVX2 includes second via holes H2. Each of the plurality of light-emitting devices 100 is connected to two pads through different second via holes H2.

The light-emitting device 100 may be a Mini LED or a Micro LED, which is not limited herein.

The pad may have both conductive properties and light reflection properties.

In some embodiments, as shown in part (b) of FIG. 9A, the pad includes the metal reflective sub-pattern 4212 and the transparent conductive protective sub-pattern 4214 disposed on a surface of the metal reflective sub-pattern 4212 facing away from the base 03.

For example, the pad includes the Ag reflective sub-pattern and the ITO sub-pattern disposed on a surface of the Ag reflective sub-pattern facing away from the base 03. That is, the pad includes the Ag reflective sub-pattern and the ITO sub-pattern (i.e., ITO/Ag), which are stacked above the base 03 in sequence.

In some embodiments, as shown in part (b) of FIG. 9B, the pad includes the metal reflective sub-pattern 4212, the first transparent conductive protective sub-pattern 4211 disposed on a surface of the metal reflective sub-pattern 4212 facing the base 03, and the second transparent conductive protective sub-pattern 4213 disposed on a surface of the metal reflective sub-pattern 4212 facing away from the base 03.

For example, the pad includes an Ag reflective sub-pattern, an ITO sub-pattern disposed on a surface of the Ag reflective sub-pattern facing away from the base 03, and an ITO sub-pattern disposed on a surface of the Ag reflective sub-pattern facing the base 03. That is, the pad includes the ITO sub-pattern, the Ag reflective sub-pattern and the ITO sub-pattern (i.e., ITO/Ag/ITO), which are stacked above the base 03 in sequence. The Ag reflective sub-pattern is mainly used for conducting electricity and reflecting light. The ITO sub-pattern is mainly used for protecting the Ag reflective sub-pattern and preventing the Ag reflective sub-pattern from being oxidized.

In some embodiments, as shown in FIG. 7A, the pads includes a plurality of first pads 421 and a plurality of second pads 422. Each first pad 421 extends in the first direction (e.g., the Y direction shown in FIG. 7A), and each second pad 422 extends in the second direction (e.g., the X direction shown in FIG. 7A). For example, the first direction is perpendicular to the second direction. At least two rows of second pads 422 are disposed between every two first pads 421 adjacent to each other in the second direction, and each row of second pads 422 includes at least one second pad 422 arranged in the second direction.

The second conductive pattern layer 42 further includes a plurality of reflective patterns 420, and each reflective pattern 420 is disposed in a region surrounded by two adjacent rows of second pads 422 and two adjacent first pads 421. The reflective pattern 420 may reflect light, so that light emitted by light-emitting device(s) is reflected by the reflective pattern 420 after reaching the reflective pattern 420, thereby improving light extraction efficiency of the flexible device 001.

In some embodiments, as shown in FIG. 7A, the plurality of light-emitting devices 100 are divided into a plurality of groups that are arranged in an array. Each group includes at least four light-emitting devices 100. The at least four light-emitting devices 100 are divided into at least two subgroups (labeled as B1 and B2 shown in FIG. 7A), each subgroup includes at least two light-emitting devices 100 connected in series through a row of second pads 422, and the at least two subgroups are connected in parallel through two first pads 421 adjacent to each other in the second direction. Each group of light-emitting devices 100 corresponds to two signal lines Gate, one of the two signal lines Gate is electrically connected to one of the two first pads 421 through at least one first via hole H1, and the other of the two signal lines Gate is electrically connected to the other of the two first pads 421 through at least one first via hole H1. In this way, the number of signal lines in the first conductive pattern layer 41 may be further reduced.

In addition, in order to drive the light-emitting devices 100, the flexible device 001 further includes a flexible printed circuit (FPC), which is connected to the signal lines Gate in the first conductive pattern layer 41, and the FPC is used for providing driving signals to the light-emitting devices 100, thereby driving the light-emitting devices 100 to emit light.

In addition, for relevant parts in the flexible device 001, reference may be made to the corresponding parts in the method of manufacturing the flexible device 001 in any embodiment described above, and adjustments may be made to the method, which is not limited herein and will not be described again.

Some embodiments of the present disclosure provide a display apparatus including the flexible device 001 described above.

Figure 12A:
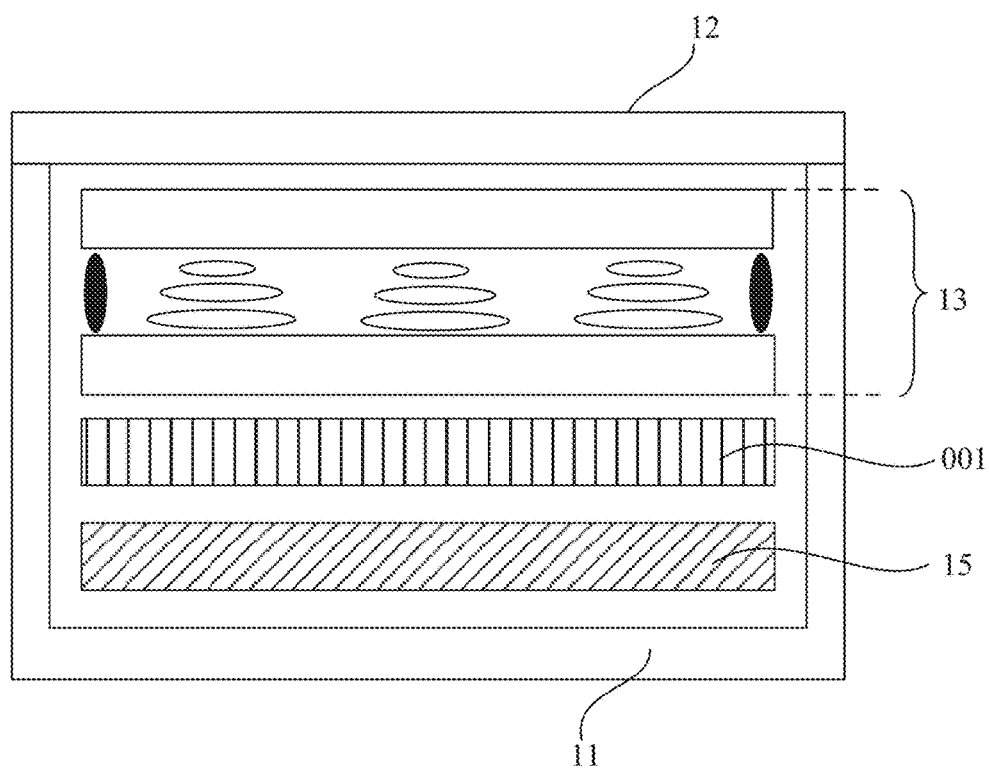
FIG. 12A is a schematic diagram showing a structure of a display apparatus, according to some embodiments of the present disclosure.

In some embodiments, the flexible device 001 is a backlight of the liquid crystal display apparatus. A structure of the liquid crystal display apparatus is shown in FIG. 12A. The liquid crystal display apparatus includes a frame 11, a cover plate 12, a liquid crystal display panel 13, a circuit board 15 and a backlight, and the liquid crystal display panel 13, the circuit board 15 and the backlight are located in a space defined by the frame 11. The backlight is the flexible device 001.

Figure 12B:
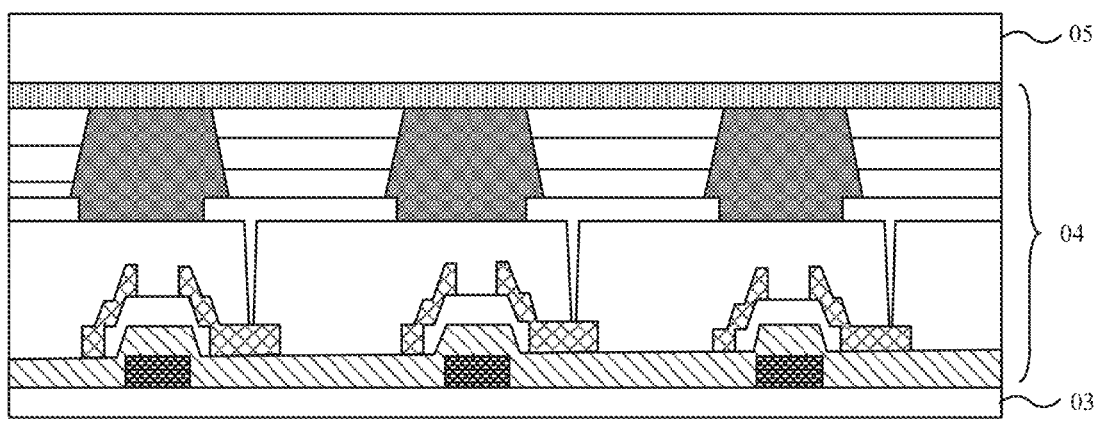
FIG. 12B is a schematic diagram showing a structure of another display apparatus, according to some embodiments of the present disclosure.

In some embodiments, the flexible device 001 is an OLED display panel, and the display apparatus is an OLED display apparatus. A structure of the OLED display apparatus is shown in FIG. 12B. On this basis, the electronic device functional layer 04 of the flexible device 001 includes a plurality of OLED devices, which may emit light of different colors, and thus display of images of different colors may be realized.

The display apparatus provided by some embodiments of the present disclosure has the same beneficial effects as the flexible device 001 provided by the foregoing embodiments. Since the beneficial effects of the flexible device 001 have been described in detail in the foregoing embodiments, details are not described herein again.

The forgoing descriptions are merely specific implementation manners of the present disclosure, but the protection scope of the present disclosure is not limited thereto. Any person skilled in the art could readily conceive of changes or replacements within the technical scope of the present disclosure, which shall all be included in the protection scope of the present disclosure. Therefore, the protection scope of the present disclosure shall be subject to the protection scope of the claims.

What is claimed is:

1. A method of manufacturing a flexible device, the method comprising:
   forming a photosensitive film on a hard base substrate, wherein the photosensitive film includes a photosensitive resin material containing azide;
   forming a base including an inorganic material on the photosensitive film;
   forming an electronic device functional layer on the base;
   forming an encapsulation layer on the electronic device functional layer;
   irradiating the photosensitive film at a side of the base substrate away from the encapsulation layer; and
   peeling off an entire structure including the base, and the electronic device functional layer and the encapsulation layer that have been formed on the base from the photosensitive film.

2. The method according to claim 1, wherein forming the photosensitive film, includes:
   forming the photosensitive film by using a photosensitive resin material containing azidonaphthalene compound.

3. The method according to claim 2, wherein forming the photosensitive film, includes:
   forming the photosensitive resin material containing the azidonaphthalene compound on the base substrate by a coating process; and
   sequentially pre-baking and curing the photosensitive resin material formed on the base substrate to form a photosensitive film with a thickness of approximately 0.3 μm to approximately 8 μm.

4. The method according to claim 1, wherein forming the base including the inorganic material on the photosensitive film, includes:
   forming the base on the photosensitive film by using an inorganic material including at least one of silicon nitride, silicon oxide, or silicon oxynitride.

5. The method according to claim 1, wherein forming the encapsulation layer on the electronic device functional layer, includes:
   forming an encapsulation layer with a thickness of approximately 5 μm to approximately 100 μm on the electronic device functional layer by using silicone rubber.

6. The method according to claim 1, wherein peeling off the entire structure including the base, and the electronic device functional layer and the encapsulation layer that have been formed on the base from the photosensitive film, includes:
   pulling up the encapsulation layer from an edge of the base substrate to peel off the base from the photosensitive film.

7. The method according to claim 1, wherein forming the electronic device functional layer on the base, includes:
   forming a first conductive pattern layer including signal lines on the base;
   forming a first insulating layer on the first conductive pattern layer, the first insulating layer including at least one first via hole at a position corresponding to each of at least part of the signal lines;
   forming a second conductive pattern layer including pads on the first insulating layer, each of at least part of the pads being connected to a corresponding signal line through at least one first via hole;
   forming a second insulating layer including a plurality of second via holes on the second conductive pattern layer; and
   bonding each of a plurality of light-emitting devices to two pads through different second via holes.

8. The method according to claim 7, wherein forming a first conductive pattern layer including signal lines on the base, includes:
   forming a copper film with a thickness of approximately 2 μm to approximately 100 μm on the base by using copper; and
   patterning the copper film through exposure, development, and etching processes to form the first conductive pattern layer including the signal lines.

9. The method according to claim 7, wherein forming a second conductive pattern layer including pads on the first insulating layer, includes:
   forming a metal reflective film on the first insulating layer;
   forming a transparent conductive protective film on the metal reflective film; and
   performing a single patterning process on the metal reflective film and the transparent conductive protective film to form the second conductive pattern layer including the pads, wherein each pad includes a metal reflective sub-pattern and a transparent conductive protective sub-pattern that are stacked;
   or,
   forming a second conductive pattern layer including pads on the first insulating layer, includes:
   forming a first transparent conductive protective film on the first insulating layer;
   forming a metal reflective film on the first transparent conductive protective film;
   forming a second transparent conductive protective film on the metal reflective film; and
   performing a single patterning process on the first transparent conductive protective film, the metal reflective film and the second transparent conductive protective film to form the second conductive pattern layer including the pads, wherein each pad includes a first transparent conductive protective sub-pattern, a metal reflective sub-pattern and a second transparent conductive protective sub-pattern, all of which are stacked.

10. The method according to claim 7, wherein forming a second conductive pattern layer including pads on the first insulating layer, includes:
    forming a second conductive pattern layer including a plurality of first pads, a plurality of second pads and a plurality of reflective patterns on the first insulating layer, wherein
    each first pad extends in a first direction, each second pad extends in a second direction perpendicular to the first direction; and at least two rows of second pads are disposed between every two first pads adjacent to each other in the second direction, each row of second pads includes at least one second pad arranged in the second direction, and each reflective pattern is formed in a region surrounded by two adjacent rows of second pads and two adjacent first pads.

11. A flexible device, manufactured by using the method of manufacturing the flexible device according to claim 1, the flexible device comprising:
   the base;
   the encapsulation layer; and
   the electronic device functional layer disposed between the base and the encapsulation layer.

12. The flexible device according to claim 11, wherein the encapsulation layer includes silicon rubber, and a thickness of the encapsulation layer is in a range from approximately 5 μm to approximately 100 μm.

13. The flexible device according to claim 11, wherein the base includes an inorganic material, the inorganic material includes at least one of silicon nitride, silicon dioxide or silicon oxynitride, and a thickness of the base is in a range from approximately 100 nm to approximately 1000 nm.

14. The flexible device according to claim 11, wherein the flexible device is a backlight in a liquid crystal display apparatus.

15. The flexible device according to claim 14, wherein the electronic device functional layer includes a first conductive pattern layer, a first insulating layer, a second conductive pattern layer, a second insulating layer and a plurality of light-emitting devices, all of which are sequentially stacked in a direction away from the base toward the encapsulation layer;
   the first conductive pattern layer includes signal lines;
   the first insulating layer includes at least one first via hole at a position corresponding to each of at least part of the signal lines;
   the second conductive pattern layer includes pads, and each of at least part of the pads is connected to a corresponding signal line through at least one first via hole;
   the second insulating layer includes second via holes; and
   each of the plurality of light-emitting devices is connected to two pads through different second via holes.

16. The flexible device according to claim 15, wherein the pads includes a plurality of first pads and a plurality of second pads, each first pad extends in a first direction, and each second pad extends in a second direction perpendicular to the first direction; and at least two rows of second pads are disposed between every two first pads adjacent to each other in the second direction, and each row of second pads includes at least one second pad arranged in the second direction; and
   the second conductive pattern layer further includes a plurality of reflective patterns, and each reflective pattern is in a region surrounded by two adjacent rows of second pads and two adjacent first pads.

17. The flexible device according to claim 16, wherein the plurality of light-emitting devices are divided into a plurality of groups that are arranged in an array, and each group includes at least four light-emitting devices; and the at least four light-emitting devices are divided into at least two subgroups, each subgroup includes at least two light-emitting devices connected in series through a row of second pads, and the at least two subgroups are connected in parallel through two first pads adjacent to each other in the second direction; and
   the group corresponds to two signal lines, and one of the two signal lines is electrically connected to one of the two first pads through at least one first via hole; and another one of the two signal lines is electrically connected to another one of the two first pads through at least one first via hole.

18. The flexible device according to claim 15, wherein one of the pads includes a metal reflective sub-pattern and a transparent conductive protective sub-pattern disposed on a surface of the metal reflective sub-pattern facing away from the base; or
   one of the pads includes; a metal reflective sub-pattern, a first transparent conductive protective sub-pattern disposed on a surface of the metal reflective sub-pattern facing the base, and a second transparent conductive protective sub-pattern disposed on a surface of the metal reflective sub-pattern facing away from the base.

19. The flexible device according to claim 15, wherein one of the plurality of light-emitting devices is a mini light-emitting diode (Mini LED) or a micro light-emitting diode (Micro LED).

20. A display apparatus, comprising the flexible device according to claim 11.

* * * * *